United States Patent
Kachuk

[11] Patent Number: 5,811,955
[45] Date of Patent: Sep. 22, 1998

[54] ELECTRO-START MOTOR SWITCH

[75] Inventor: Paul T. Kachuk, Fort Wayne, Ind.

[73] Assignee: Flint & Walling Industries, Inc., Kendallville, Ind.

[21] Appl. No.: 705,444

[22] Filed: Aug. 29, 1996

[51] Int. Cl.⁶ .................................................. A02P 1/42
[52] U.S. Cl. ........................................ 318/786; 318/781
[58] Field of Search .................................. 318/778–797

[56] References Cited

U.S. PATENT DOCUMENTS

| | | | |
|---|---|---|---|
| 3,819,995 | 6/1974 | Ballman | 318/786 |
| 3,848,140 | 11/1974 | Guermeur et al. | 307/252 |
| 4,307,327 | 12/1981 | Streater et al. | |
| 4,325,012 | 4/1982 | Schaefer | 318/786 |
| 4,463,304 | 7/1984 | Miller | |
| 4,468,604 | 8/1984 | Zaderej | |
| 4,670,697 | 6/1987 | Wrege et al. | 318/786 |
| 4,695,913 | 9/1987 | Terrocal et al. | 361/13 |
| 4,843,295 | 6/1989 | Thompson et al. | 318/786 |
| 4,862,053 | 8/1989 | Jordan et al. | 318/786 |
| 5,460,221 | 10/1995 | Stalsburg et al. | 165/25 |
| 5,473,202 | 12/1995 | Mudge et al. | 307/116 |
| 5,491,398 | 2/1996 | Haner | 318/725 |

Primary Examiner—David S. Martin
Attorney, Agent, or Firm—Edgar A. Zarins; Malcolm L. Sutherland

[57] ABSTRACT

An electrical circuit for controlling start windings in induction motors of various sizes or horsepowers providing a broad range of application. The circuit for controlling start winding switching measures the current through both the start and run windings of the motor allowing the use of a single solid state device in the circuit. This combined current develops a voltage across a resistor which is used to gate on the solid state device when the voltage exceeds a threshold level. By using the solid state device in combination with the special resistor, a motor start switch is formed which can be used to start a wide range of dual voltage motors.

8 Claims, 2 Drawing Sheets

ELECTRO-START MOTOR SWITCH

BACKGROUND OF THE INVENTION

I. Field of the Invention

This invention relates to an electric switch for starting a motor such as a pump motor and, in particular, to an electro-start switch incorporating a single solid state component for starting a wide range of dual voltage motors with minimum modification of the switch.

II. Description of the Prior Art

Single-phase motors typically require the inclusion of a start winding to cause the main windings in the motor to produce magnetic fields having a rotational character. Once started, the rotating rotor will itself give rise to induced magnetic fields such that a two-pole run winding is capable of maintaining the rotation of the rotor. The start winding is energized for only a short period of time following start-up to permit the motor to be brought up to operating speed and which is thereafter de-energized.

Small application induction motors require dual windings, a start winding and a run winding, for control of operation particularly the start-up and continuous operation of the motor. The start winding is used in initially activating the motor. As a certain threshold level is reached, control of the motor will be transferred to the run winding for continuous operation. Prior known electronic devices measure voltage or current flow only through the start winding to determine switching from the start winding to the run winding. However, the known switches had limited application since different horsepower motors required different switch configurations. Moreover, the prior known switching device incorporates a wide variety of components increasing the cost and complexity of the device. More recently, the control circuits have included a solid state gateable or triggerable device such as a triac or SCRs. Thus, the control circuit is provided to energize the start winding only at motor start up and at low motor speed conditions.

SUMMARY OF THE PRESENT INVENTION

The present invention overcomes the disadvantages of other prior known control circuits for a dual winding motor by providing a circuit which senses the total inrush current of both the run winding and the start winding to switch to the run winding of the motor thereby reducing the number of components and the cost of such control circuits.

Small application, single-phase motors include a rotor in association with a start winding and a main winding. The start winding is used during the initial start-up of the motor and the run winding controls the continuous operation of the rotor. A start capacitor is used in the start-up. The control circuit of the present invention simply includes a solid-state component and a resistor having three separate terminals. In accordance with the size of the motor to be started, the run winding is connected to a different terminal of the resistor. The voltage developed across the resistor is used to gate on the solid-state component when the voltage exceeds a threshold level. In a preferred embodiment of the control circuit, the solid state component is an alternistor and the resistor is a stainless steel resistor with large surface area for heat dissipation.

By using the alternistor and special resistor, a motor start switch is provided which can be used to start dual voltage motors from ¼ horsepower to 5 horsepower. Unlike prior known devices, a separate switch for each horsepower motor is not needed.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
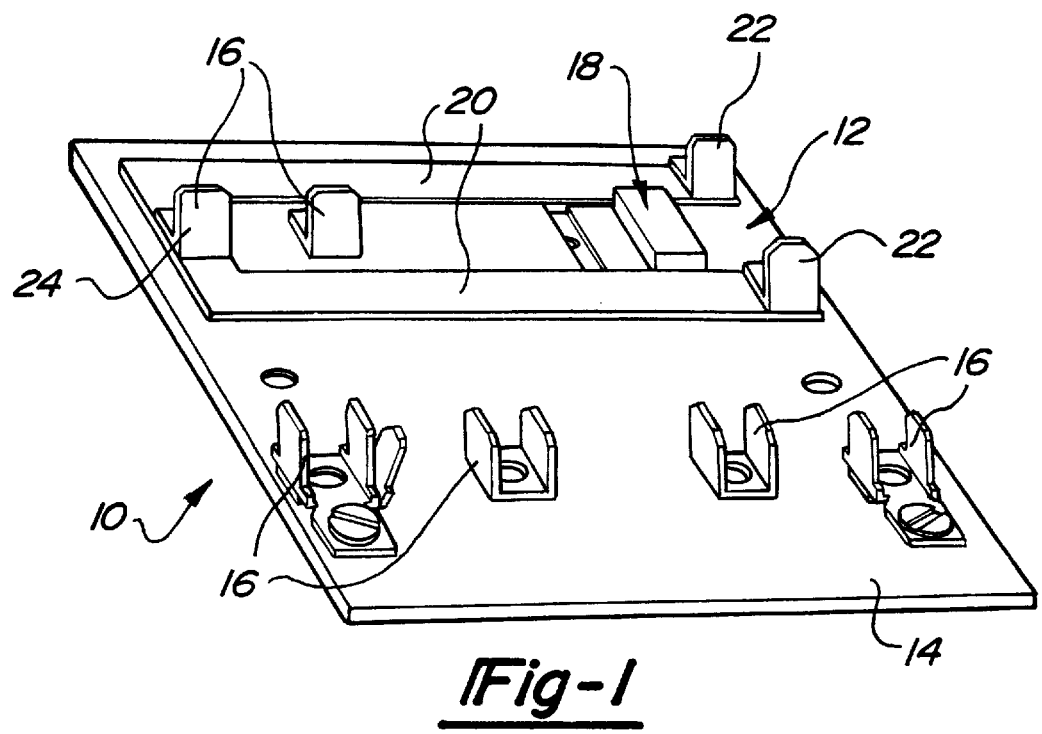
FIG. 1 is a perspective of a circuit board incorporating the control circuit of the present invention.
Figure 2:
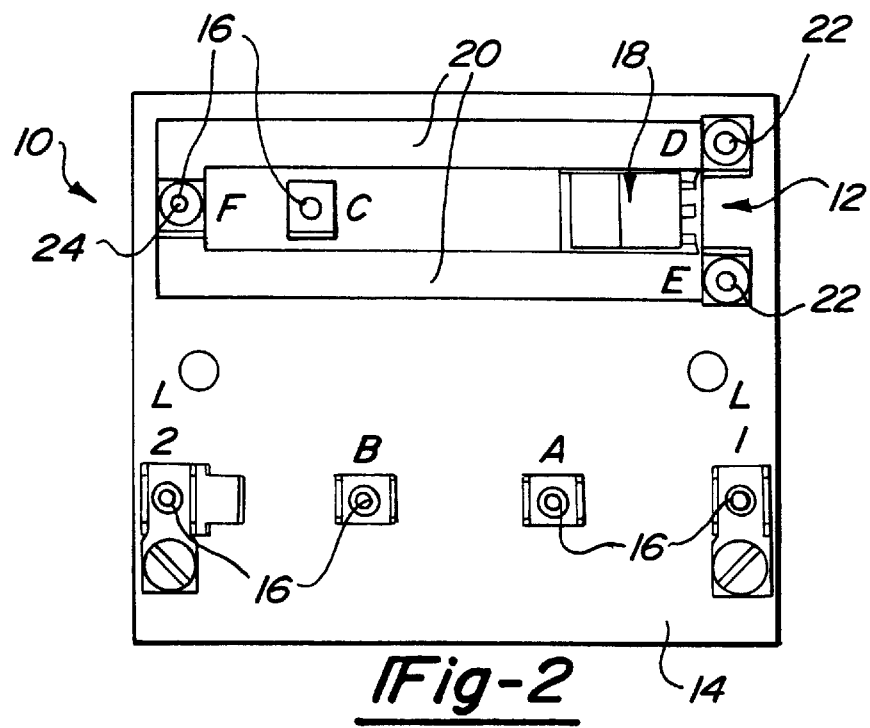
FIG. 2 is a plan view thereof.

Referring first to FIGS. 1 and 2, there is shown a circuit board 10 incorporating a start switch circuit 12 embodying the present invention. The start switch circuit 12 is used to control the initial start-up of a single phase motor, specifically switching from the start winding to the run winding associated with the rotor. The start circuit 12 is connected to the windings and the line voltage for the motor as will be subsequently described. The board 10 will be built into the motor housing for operation in conjunction with the operating switch and in line with the power source for the motor.

The circuit board 10 includes a platform 14 to which the start switch 12 is mounted and electronically connecting a series of terminals 16 used to connect the components of the motor. The start switch 12 includes a gateable solid state device preferably an alternistor 18 mounted to the platform 14 in connection with a resistor 20. The resistor 20 is preferably a stable stainless steel resistor with a large surface area for heat dissipation. The resistor 20 has a U-shaped configuration with end terminals 22 (identified as terminals D and E on the board 10) and an intermediate terminal 24 (identified as terminal F on the board 10). The alternistor 18 has its terminals 26 connected directly to the end terminals 22. The voltage developed across the resistor 20 is used to gate on the alternistor 18 when the voltage exceeds a predetermined level. The alternistor 18 has better dv/dt characteristics than a triac used in many prior known switches. In fact, the static and commuting dv/dt capability of the alternistor 18 is so improved that a snubber network is not required. Furthermore, the alternistor 18 has such excellent one-cycle surge rating at 100 Apk that it consumes more than adequate locked motor current capability. The single-chip alternistor 18 offers the same performance as two SCRs wired back-to-back thereby providing improved commuting and turn-off ability over a standard triac chip.

Figure 3:
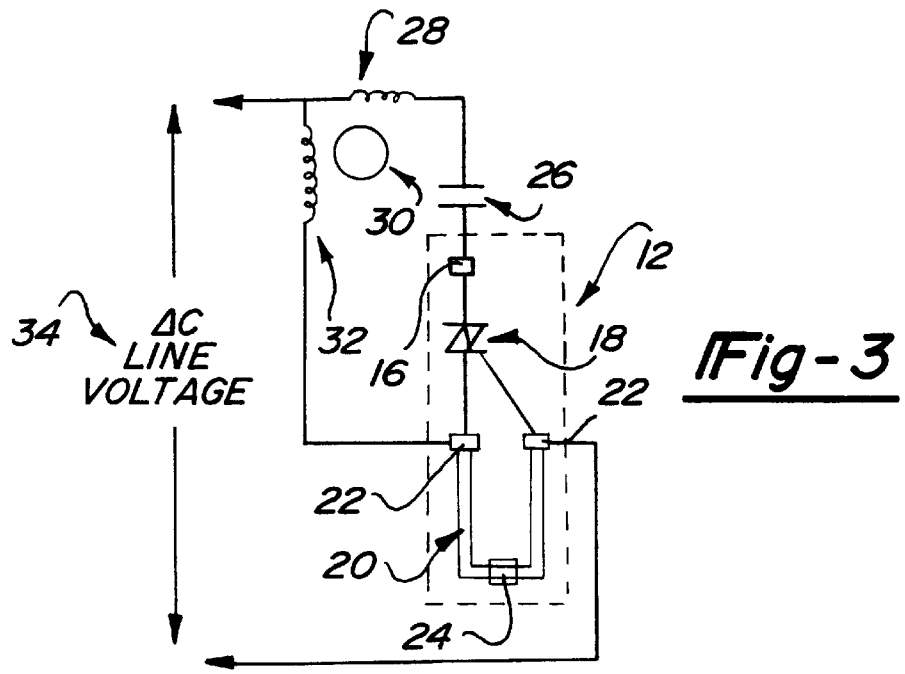
FIG. 3 is a schematic diagram of the control circuit incorporated into a low horsepower motor circuit.
Figure 4:
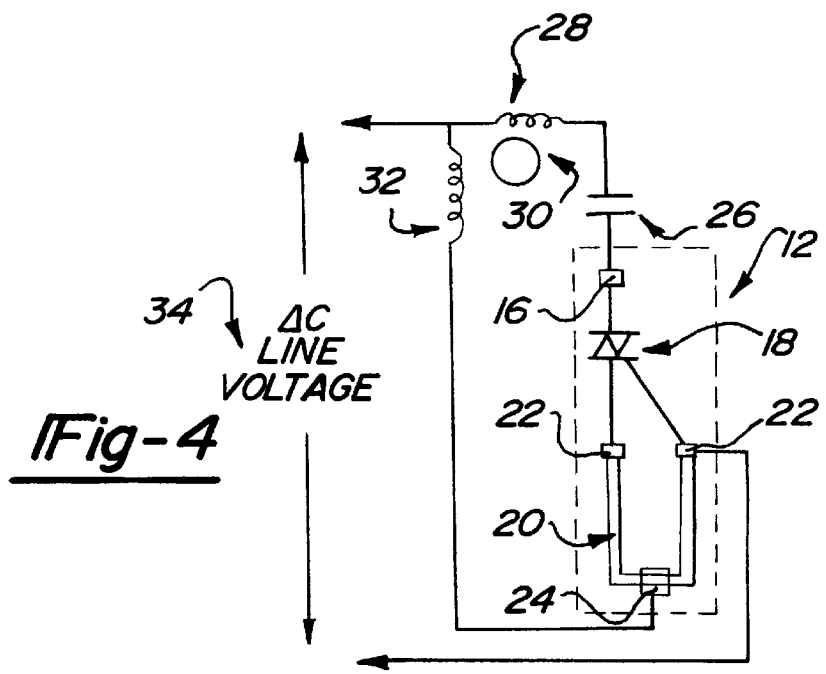
FIG. 4 is a schematic diagram of the control circuit incorporated into a higher horsepower motor circuit.

Referring now to FIGS. 3 and 4, using the alternistor 18 and resistor 20, a motor start switch can be constructed to start dual voltage motors over a wide range of horsepowers. FIG. 3 shows a circuit configuration for starting low horsepower motors in the range of ¼ and 1¼ hp. FIG. 4 shows a circuit configuration for starting higher horsepower motors in the range of 1½ to 4 hp. The wiring configurations for both circuits utilize identical components including a start capacitor 26 connected to the terminal 16 of the alternistor 18. The capacitor 26 is connected in series with a start winding 28 mounted proximate a rotor 30 of the pump motor. A main or run winding 32 is also mounted proximate the rotor 30 for continuous operation of the rotor 20 after switching from the start winding 28. An AC line voltage 34 is supplied across the circuit for operation of the switch 12 and subsequent operation of the motor.

In order to accommodate the different horsepower motors, the main winding 32 is connected to different terminals of the resistor 20. For the low horsepower motors, the run winding 32 is connected to the end terminal 22 of the resistor 20 as shown in FIG. 3. For increased horsepower motors, the run winding 32 is connected to the intermediate terminal 24 of the resistor 20. Accordingly, the different connections are used to vary the voltage across the loop resistor 20 for gating or switching the alternistor 18. Since the inrush motor current during starting is several times the running current, by utilizing the total inrush current of both the main winding 32 and the start winding 28 greater control is provided. This current develops a voltage across the loop resistor 20 which is used to gate on the alternistor 18 when the voltage exceeds a predetermined threshold level. As a result, identical componentry can be used in the start circuitry of a wide range of motors resulting in substantial cost savings.

The foregoing detailed description has been given for clearness of understanding only and no unnecessary limitations should be understood therefrom as some modifications will be obvious to those skilled in the art without departing from the scope and spirit of the appended claims.

What is claimed is:

1. A start circuit for a single-phase electric motor connectable to AC power supply lines having a line voltage thereon comprising:

a main winding and a start winding connected in parallel and adapted to be connected to the power supply lines;

a loop resistor having a first end terminal, a second end terminal, and an intermediate terminal, said first end terminal connected to the power supply lines; and an alternator connected between said first and second end terminals of said loop resistor and in series with said start winding;

wherein said main winding is connected to one of said second end terminal of said loop resistor and said intermediate terminal of said loop resistor for operation of different electric motors, said alternistor being gated in response to voltage developed across said loop resistor in proportion to the current flow across said main and start winding.

2. The apparatus as defined in claim 1 and further comprising a start capacitor connected in series between said alternistor and said start winding.

3. The apparatus as defined in claim 2 wherein said main winding is connected to said second end terminal of said loop resistor for forming a start circuit for electric motors of less than 1½ horsepower.

4. The apparatus as defined in claim 2 wherein said main winding is connected to said intermediate terminal of said loop resistor for forming a start circuit for electric motors of greater than one horsepower.

5. A start circuit for a single-phase electric motor connectable to AC power supply lines having a line voltage thereon, said circuit comprising:

a main winding and a start winding connected in parallel and adapted to be connected to the power supply lines;

a loop resistor having a first end terminal, an intermediate terminal and a second end terminal. said first end terminal connected to the power supply lines; and an alternistor connected in series between said loop resistor and said start winding, said alternistor being gated in response to voltage developed across said loop resistor in proportion to the current flow across said main and start windings;

wherein said main winding is connected to one of said second end terminal and said intermediate terminal of said loop resistor for operation of different electric motors.

6. The apparatus as defined in claim 5 wherein said alternistor is connected between said end terminals of said loop resistor and in series with said start winding.

7. The apparatus as defined in claim 6 wherein said main winding is connected to said second end terminal of said loop resistor for forming a start circuit for electric motors of less than 1½ horsepower.

8. The apparatus as defined in claim 6 wherein said main winding is connected to said intermediate terminal of said loop resistor for forming a start circuit for electric motors of greater than one horsepower.

* * * * *